(12) United States Patent
Ziegler

(10) Patent No.: US 10,994,977 B2
(45) Date of Patent: May 4, 2021

(54) DEVICE FOR FILLING A CONTAINER WITH A FILLING PRODUCT

(71) Applicant: KRONES AG, Neutraubling (DE)

(72) Inventor: Manfred Ziegler, Neutraubling (DE)

(73) Assignee: KRONES AG, Neutraubling (DE)

( * ) Notice: Subject to any disclaimer, the term of this patent is extended or adjusted under 35 U.S.C. 154(b) by 0 days.

(21) Appl. No.: 16/484,559

(22) PCT Filed: Feb. 13, 2018

(86) PCT No.: PCT/EP2018/053485
§ 371 (c)(1),
(2) Date: Aug. 8, 2019

(87) PCT Pub. No.: WO2018/146324
PCT Pub. Date: Aug. 16, 2018

(65) Prior Publication Data
US 2020/0024117 A1    Jan. 23, 2020

(30) Foreign Application Priority Data
Feb. 13, 2017   (DE) ..................... 10 2017 102 852.8

(51) Int. Cl.
| | |
|---|---|
| *B67C 3/00* | (2006.01) |
| *G01F 23/30* | (2006.01) |
| *G01F 23/296* | (2006.01) |
| *B67C 3/20* | (2006.01) |
| *B67C 7/00* | (2006.01) |
| *G01F 23/24* | (2006.01) |

(Continued)

(52) U.S. Cl.
CPC ............. *B67C 3/20* (2013.01); *B67C 3/001* (2013.01); *B67C 7/00* (2013.01); *G01F 23/24* (2013.01); *G01F 23/26* (2013.01); *G01F 23/284* (2013.01); *G01F 23/296* (2013.01); *G01F 23/30* (2013.01)

(58) Field of Classification Search
CPC .. B67C 3/20; B67C 3/001; B67C 7/00; B67C 3/00; G01F 23/24; G01F 23/26; G01F 23/284; G01F 23/296; G01F 23/30
See application file for complete search history.

(56) References Cited

U.S. PATENT DOCUMENTS

| | | | |
|---|---|---|---|
| 9,170,144 B2 | 10/2015 | Qi | |
| 2009/0064757 A1* | 3/2009 | Calabrese | G01F 23/266 73/1.73 |

FOREIGN PATENT DOCUMENTS

| | | |
|---|---|---|
| CN | 103723666 A | 4/2014 |
| CN | 104098059 A | 10/2014 |

(Continued)

OTHER PUBLICATIONS

Translation of EP 2 719 655 (Year: 2013).*
First Office Action received in Chinese Application No. 201880011680.3, dated Jun. 4, 2020.

*Primary Examiner* — Jason K Niesz
(74) *Attorney, Agent, or Firm* — Maschoff Brennan

(57) ABSTRACT

A device for filling a container with a filling product, preferably for filling a beverage container in a beverage filling plant, comprising a filling product reservoir for accommodating the filling product to be filled and a first fill level probe for determining the filling product level in the filling product reservoir during a filling mode, wherein a second fill level probe is provided for determining a cleaning fluid level in the filling product reservoir during a cleaning mode.

14 Claims, 1 Drawing Sheet

(51) Int. Cl.
G01F 23/26 (2006.01)
G01F 23/284 (2006.01)

(56) References Cited

FOREIGN PATENT DOCUMENTS

| | | |
|---|---|---|
| CN | 204097050 U | 1/2015 |
| CN | 104891404 A | 9/2015 |
| DE | 29609831 U1 | 7/1997 |
| EP | 2343518 A1 | 7/2011 |
| EP | 2719655 A1 | 4/2014 |
| GB | 2190494 A | 11/1987 |

\* cited by examiner

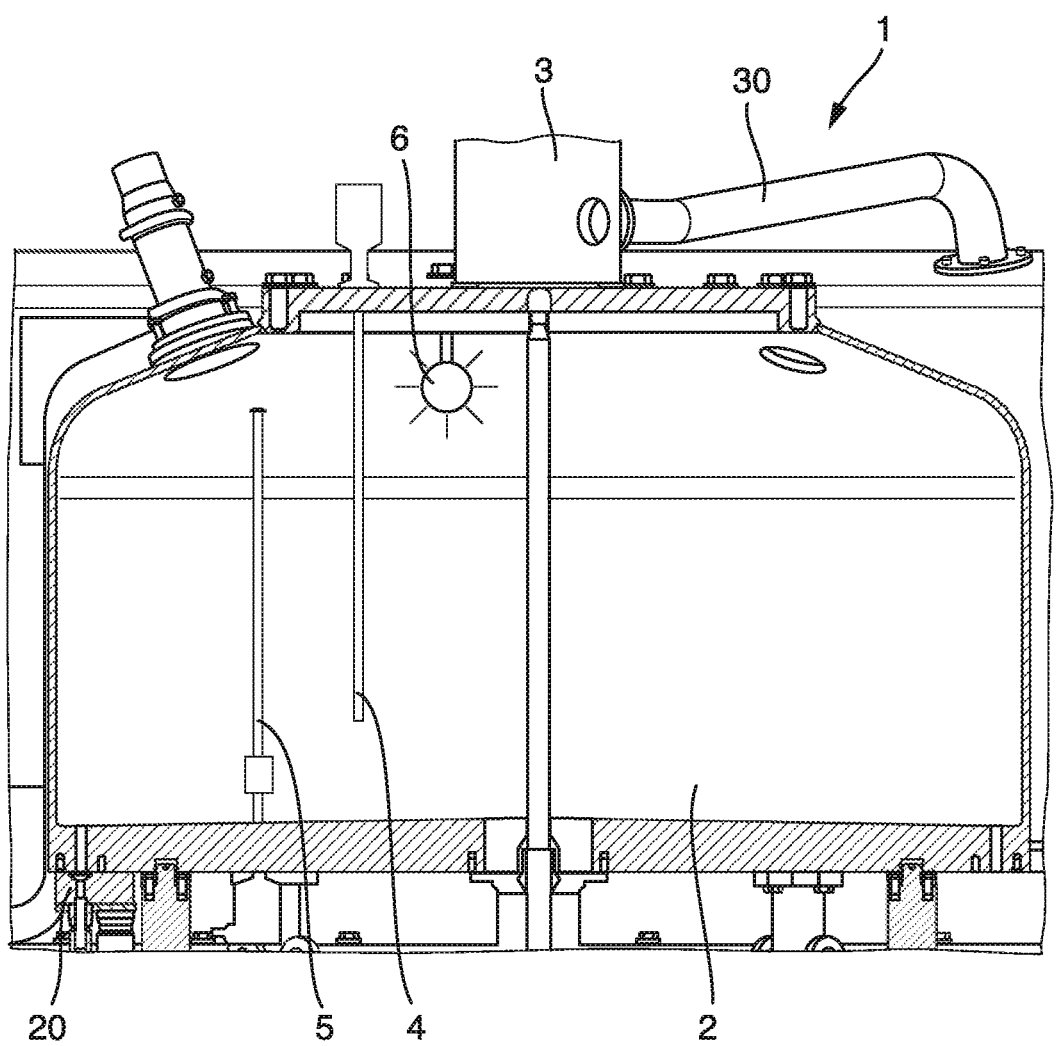

DEVICE FOR FILLING A CONTAINER WITH A FILLING PRODUCT

TECHNICAL AREA

The present invention relates to a device for filling a container with a filling product, for example, a beverage filling plant for filling a beverage in a beverage container.

TECHNICAL BACKGROUND

Temporarily storing the filling product, which is subsequently filled in containers to be filled, at different positions within the beverage filling plant is known in beverage filling plants. For example, providing a filling product reservoir in the form of a ring bowl or a central bowl directly on a filler of the beverage filling plant is known, wherein the filling product to be filled is kept available immediately before the filling in the filling product reservoir. The filling product is then guided from the filling product reservoir to the respective filling valve, by means of which the filling product is then guided in a controlled manner in the desired quantity, the desired mass, the desired weight, or the desired filling level into the container to be filled.

Further filling product reservoirs are provided in a beverage filling plant, for example, in the form of buffer tanks. Such a buffer tank can be provided, for example, before and after a sterilization system, for example, a short-term heating system, to be able to maintain a predetermined filling product flow through the sterilization system for sterilizing the filling product using the predetermined parameters. This is significant in particular to be able to maintain a predetermined treatment time within the sterilization system, independently of how high the following withdrawal of the filling product is at the respective point in time, for example, in the event of system malfunctions at the filler.

Further filling product reservoirs can also be provided in the form of an auxiliary filling product tank at a filler or in the form of tanks, in which the carbonization of the filling product is performed. Further filling product reservoirs can be provided in different embodiments, volumes, and positions in a filling product filling plant. For example, a production tank can also be provided in a filling product filling plant, in which the filling product is firstly produced, mixed together, or provided in another form before the actual filling into the containers.

The mentioned filling product reservoirs share the feature that it is frequently necessary for the control and/or the regulation of the components of a filling product filling plant to determine the fluid level currently present in the respective filling product reservoir. This can be necessary, for example, since a constant filling product level is required in the filling product reservoir for reliable control of the respective filling product filling method, or to vary, for example, accelerate, slow, end, or trigger, upstream or downstream process steps.

In known filling product filling plants, the filling product reservoirs or at least some of the provided filling product reservoirs are accordingly provided with fill level probes, by means of which the filling product level within the respective filling product reservoir can be determined.

Furthermore, cleaning the filling-product-guiding paths within a filling product filling plant is known, in order to keep the filling product filling plant in a hygienically perfect state and ensure the product purity in the event of product changes. Different methods for treating the respective filling-product-contacted surfaces are known for this purpose, for example, completely flushing through the filling-product-guiding lines and also the respective filling product reservoirs or also treating the respective filling-product-contacted surfaces by means of spray nozzles provided inside the filling-product-guiding regions and in particular inside the filling product reservoirs.

To ensure within the filling product filling plant that the cleaning procedure is also carried out reliably, heretofore the fill level probes, which are used to determine the filling product level during the filling mode, have also been used to determine a cleaning fluid level during the respective cleaning mode.

A device for determining a fluid level and a fluid quality and also faults in a detection device and problems in a fluid supply is known, for example, from US 2015/0013646 A1, in which a fill level probe for ascertaining the filling product level and a capacitive sensor separate therefrom for ascertaining further features and in particular the fluid quality of the filling product are provided.

DESCRIPTION OF THE INVENTION

Proceeding from the known prior art, it is an object of the present invention to specify a device for filling a container with a filling product, which enables both a reliable and efficient filling mode and also a reliable and efficient cleaning mode.

This object is achieved by a device having the features of claim 1. Advantageous developments result from the dependent claims, the present description, and the FIGURE.

Accordingly, a device is proposed for filling a container with a filling product, preferably for filling a beverage container in a beverage filling plant, comprising a filling product reservoir for accommodating the filling product to be filled and a first fill level probe for determining the filling product level in the filling product reservoir during a filling mode. According to the invention, a second fill level probe is provided for determining a cleaning fluid level in the filling product reservoir during a cleaning mode.

Because a first fill level probe is present, which is provided for determining the filling product level during the filling mode, the information required for the filling mode with respect to the filling product level within a filling product reservoir can be provided. The first fill level probe can accordingly be adapted to the respective filling product to be filled in such a way that a more efficient and reliable filling mode is ensured.

The second fill level probe is provided for determining the cleaning fluid level in the filling product reservoir during the cleaning mode. The second fill level probe can accordingly be adapted to the respective properties and conditions of the cleaning mode, to obtain a reliable statement about the respective cleaning fluid level in the filling product reservoir during the cleaning mode. Reliable and efficient cleaning can accordingly be carried out.

Filling mode is understood herein as an operating mode of the device for filling a container in which the actual filling product is produced, provided, modified, portioned, and introduced into the container to be filled.

Cleaning mode is understood herein as an operating mode of the device for filling a container in which cleaning is performed, in particular of the filling-product-contacted paths and components of the device. The cleaning mode is typically carried out in regular cycles after several operating hours in the filling mode, after plant malfunctions have been remedied, or in the event of product changes.

A device is thus specified, by means of which, as a result of the provision of the first fill level probe, the filling product level within the filling product reservoir can be ascertained efficiently and reliably for the different fluids processed and filled in the device in the filling mode. Furthermore, the cleaning media level in the cleaning mode is ascertained efficiently and reliably in the device by means of the provision of the second fill level probe.

For example, it can be necessary for the filling of high-viscosity products, for example, baby food, ketchup, mayonnaise, certain milk products, etc., to provide a fill level probe in the filling product reservoir which is adapted to the special properties of the filling product. For example, fill level probes which comprise mechanically movable parts such as floats, for example, are not suitable for measuring a fill level of a high-viscosity product, for example, of ketchup. In particular, these high-viscosity products can have the result that they "stick together" the mechanism guiding the floats and thus a synchronization between float and fluid level is no longer reliably provided.

Capacitive fill level probes or fill level probes which are based on a guided microwave, for example, are not suitable for the filling of filling products which have a low dielectric constant. Resistive fill level probes are not suitable for filling products which only comprise a few ions. Accordingly, the first fill level probe, which is provided for ascertaining the fill level during the filling mode, can be adapted to the respective filling product to achieve a reliable and rapid determination of the filling product level.

For this purpose, the first fill level probe can preferably comprise a float-free measuring system, for example, an inductive measuring system and/or a resistive measuring system and/or a capacitive measuring system and/or a measuring system based on a guided microwave and/or an optical measuring system and/or an optoelectronic measuring system and/or an ultrasonic measuring system. The filling product level can be measured reliably, rapidly, and process-securely by means of such a float-free measuring system.

The second fill level probe is preferably provided so that it can determine the level of a cleaning fluid within the filling product reservoir. In particular if the internal cleaning of the filling product reservoir is performed via spray nozzles, float-free measuring systems are sometimes overloaded and/or cannot carry out reliable measurements, since spray mist or spray jets of the cleaning fluid are substantially or completely impinged to the float-free sensor.

Because of the spray mist and the spray jets exiting through the spray nozzle inside the filling product reservoir, a measurement accordingly cannot be reliably carried out, for example, using a resistive or capacitive measuring system or also a measuring system based on a guided microwave and/or optical fill level measuring system. A probe short-circuit can possibly even be generated by the wetting of the entire sensor or large regions of the sensor with the spray mist and/or the spray jets, so that a reliable fill level determination is not enabled.

The second fill level probe is accordingly preferably one which enables a reliable fill level determination with the low-viscous cleaning liquids and is particularly preferably a fill level probe which comprises a float, for example, a measuring system which comprises a float coupled to a distance sensor.

The device particularly preferably comprises a control device, which is configured to control or regulate the filling of the filling product in the container to be filled in the filling mode and to determine the filling product level in the filling product reservoir via the first fill level probe.

The device furthermore preferably comprises a control device, which is configured to control and/or regulate the cleaning mode and to determine the cleaning fluid level in the filling product reservoir via the second fill level probe in the cleaning mode.

The control device is preferably configured to control or regulate both the cleaning mode and also the filling mode, wherein in the filling mode, the determination of the filling product level in the filling product reservoir is performed by means of the first fill level probe and in the cleaning mode, the determination of the cleaning fluid level is performed by means of the second fill level probe.

The filling product reservoir is preferably a filling product tank and/or an auxiliary filling product tank and/or a buffer tank and/or a buffer tank of a sterilization or pasteurization device and/or a carbonization tank and/or a filler bowl and/or a central bowl and/or a ring bowl. In other words, the filling product reservoir can be any arbitrary tank within the device for filling a container, in which the filling product level has to be determined during the filling mode. In addition to the actual filling of the filling product into the container to be filled, the filling mode also includes the provision, production, or processing of the filling product before the actual filling, for example, by production, mixing, sterilization, or pasteurization of the filling product.

The filling product reservoir is preferably in communication with a filling valve for controlling the filling of the container to be filled with the filling product, particularly preferably in direct communication. The filling product can be guided out of the filling product reservoir into the container to be filled through the filling valve in a manner known per se, wherein the filling procedure can then be controlled or influenced on the basis of the filling product level.

Direct communication is understood herein to mean that the filling valve is connected to the filling product reservoir without interconnection of further plant components (except for lines). The filling valve is accordingly attached directly to the filling product reservoir or only a line is provided between the filling product reservoir and the filling valve.

In one preferred development, a device for applying a cleaning fluid to the filling-product-contacted surfaces of the filling product reservoir is provided in the filling product reservoir, preferably a spray nozzle for spraying the filling-product-contacted surfaces of the filling product reservoir with the cleaning fluid. The spray nozzle is preferably provided in an upper region of the filling product reservoir to avoid immersion of the spray nozzle in the filling product in the filling mode.

The above-mentioned object is also achieved by a method having the features of claim 9, in which the filling product level in the filling product reservoir is determined in the filling mode by a first fill level probe and a cleaning media level in the filling product reservoir is determined in the cleaning mode by a second fill level probe.

The advantageous refinements and advantages of the device which are mentioned above are also similarly relevant to the method.

BRIEF DESCRIPTION OF THE FIGURE

Further preferred embodiments of the invention will be explained in greater detail by the following description of the FIGURE. In the FIGURE:

FIG. 1 shows a schematic and perspective illustration in partial section through a filling product reservoir having a first fill level probe and a second fill level probe.

DETAILED DESCRIPTION OF PREFERRED EXEMPLARY EMBODIMENTS

Preferred exemplary embodiments are described hereafter on the basis of the FIGURE.

FIG. 1 shows a perspective and schematic illustration in partial section of a filling product reservoir 2 of a device 1 for filling a container (not shown here) with a filling product.

The filling product reservoir 2 is illustrated in the exemplary embodiment shown in FIG. 1 in the form of a central bowl of a filler of the device 1 for filling the container. Accordingly, schematically illustrated filling valves 20 are in communication with the filling product reservoir 2, via which the filling product located in the filling product reservoir 2 may be guided in a controlled or regulated manner into the respective container to be filled. The filling valve 20 can also be in direct communication with the filling product reservoir 2, i.e., without interconnection of further plant components (except for lines).

In order to achieve the desired filling product level, the desired filling product mass, or the desired filling product volume, respectively, in the respective container to be filled in specific filling methods, the filling product queueing at the respective filling valves 20 has to be kept at a constant filling product level to keep the hydrostatic pressure stable at every filling valve 20 and thus achieve defined conditions for the actuation of the filling valves 20.

In alternative filling methods, the filling product level in the filling product reservoir 2 can also vary, however, the level of the respective filling product level in the filling product reservoir 2 then has to be transferred in some of the alternative filling methods to the respective control device, in order to control and/or regulate the behavior of the filling valves 20 accordingly in such a way that the desired filling result can be achieved even with a varying hydrostatic pressure at the respective filling valve 20.

Into the filling product reservoir 2, the filling product is fed, for example, via a schematically indicated rotary distributor 3 and a filling product feed line 30, wherein the feed of the filling product is controlled via the filling product feed line 30 by means of a control device in such a way that the desired filling product level is reached in the filling product reservoir 2.

To determine the filling product level inside the filling product reservoir 2, a first fill level probe 4 is provided, which is illustrated in the exemplary embodiment shown as a float-free fill level probe. The first fill level probe 4 is, for example, an inductive measuring system, a resistive measuring system, a capacitive measuring system, a measuring system based on a guided microwave, an optical measuring system, an optoelectronic measuring system, and/or an ultrasonic measuring system here. The fill level probe 4 can be adapted accordingly to the properties of the processed filling product.

The control device thus uses the first fill level probe 4, i.e., the float-free measuring system here, to determine the filling product level in the filling product reservoir 2 during the filling mode, for example, for controlling the supply of the filling product into the filling product reservoir 2 and/or for controlling the filling valves 20 and/or for influencing the control or regulating behavior of the filling valves 20.

To enable a hygienically perfect filling mode and to ensure product purity of the filled products, the filling product reservoir 2 is cleaned in regular cycles or in the event of a product change. For the cleaning, a cleaning fluid is applied to at least the filling-product-contacted surfaces of the device 1 and preferably the cleaning fluid is guided through the filling-product-contacted regions of the device 1.

Cleaning fluid is understood here as all media which are used for cleaning, sterilizing, and/or disinfecting the filling-product-contacted regions of the device 1. In particular, however, the filling-product-contacted regions of the device 1 are firstly flushed out using a cleaning fluid at the beginning of the cleaning mode.

In the exemplary embodiment shown, a spray nozzle 6 is provided for applying the cleaning fluid to the filling-product-contacted surfaces of the filling product reservoir 2. By means of the spray nozzle 6, the respective cleaning fluid can be applied to the interior of the filling product reservoir 2 so that the inner surfaces of the filling product reservoir 2 are cleaned.

During this cleaning of the filling product reservoir 2, it is necessary for the cleaning fluid to be applied to the entirety of the surfaces, so that accordingly in addition to the single schematically shown spray nozzle 6, a plurality of spray nozzles can also be provided in the upper region and also in other regions of the filling product reservoir 2 to achieve a continuous application to all surfaces.

The use of spray nozzles 6 is advantageous in that the cleaning fluid can be applied to the entire inner surface of the filling product reservoir 2, but the cleaning media demand can nonetheless be kept relatively low. In particular, it is not necessary to fill the filling product reservoir 2 completely with the cleaning fluid up to below the ceiling, but rather complete cleaning of the surfaces of the filling product reservoir 2 can be performed using a substantially smaller cleaning media volume.

However, the spray nozzle 6 generates spray jets and spray mist in the interior of the filling product reservoir 2 in such a way that the sprayed cleaning fluid is also applied to the entirety of the first fill level probe 4. If a float-free measuring system is used for the first fill level probe 4, a reliable determination of the cleaning fluid level in the filling product reservoir 2 accordingly cannot be performed in the cleaning mode. In particular—depending on the float-free measuring system used—the cleaning fluid also sprayed on the first fill level probe 4 in the cleaning mode can result in a probe short-circuit, so that a meaningful measurement is not possible at all.

Accordingly, a second fill level probe 5 is provided in the filling product reservoir 2, which is provided in the exemplary embodiment shown in the form of a measuring system having a float. Because of the float of the second fill level probe 5, the cleaning fluid level actually available in the filling product reservoir 2 can be reliably determined. The measurement of this cleaning fluid level in the filling product reservoir 2 by means of the second fill level probe 5 is not influenced or is at least not noticeably influenced by the spray mist and the spray jets generated by the spray nozzle 6.

A marginal but functionally harmless influence of the float can result in the cleaning mode in that the spray mist is applied to the parts of the float not immersed in the cleaning medium and a marginally deeper immersion of the float results because of the therefore marginally increased weight of the float, which results in a marginally lower readout of the float signal, but is functionally insignificant in relation to the variations of the cleaning media level.

It can accordingly be determined reliably during the cleaning mode whether a cleaning media level predetermined for the respective cleaning is reached in the filling product reservoir 2. Reaching such a cleaning media level inside the filling product reservoir 2 can therefore be significant in order to ensure that the floor of the filling product reservoir 2 is covered with cleaning medium and thus the cleaning fluid is reliably applied to all filling valves 20 out of the filling product reservoir 2.

Accordingly, a first fill level probe 4 is provided, which is used to determine the filling product level in the filling product reservoir 2 during the filling mode, and a second fill level probe 5 is provided, which is used to determine the cleaning fluid level in the filling product reservoir 2 during the cleaning mode.

A control device is accordingly configured to ascertain the filling product level via the first fill level probe 4 during the filling mode and to ascertain the cleaning media level in the filling product reservoir 2 by means of the second fill level probe 5 during the cleaning mode.

In accordance with common practice, the various features illustrated in the drawings may not be drawn to scale. The illustrations presented in the present disclosure are not meant to be actual views of any particular apparatus (e.g., device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, it is understood that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

If applicable, all individual features which are described in the exemplary embodiments can be combined and/or exchanged with one another without leaving the scope of the invention.

The invention claimed is:

1. A device for filling a container with a filling product, comprising:
   a filling product reservoir for accommodating the filling product to be filled;
   a first fill level probe for determining a filling product level in the filling product reservoir during a filling mode;
   a second fill level probe for determining a cleaning fluid level in the filling product reservoir during a cleaning mode; and
   a control device configured to control the filling mode and the cleaning mode, wherein the control device is configured to:
      determine the filling product level in the filling product reservoir via the first fill level probe in the filling mode, and
      determine the cleaning fluid level in the filling product reservoir via the second fill level probe in the cleaning mode.

2. The device according to claim 1, wherein the second fill level probe comprises a measuring system provided with a float.

3. The device according to claim 1, wherein the filling product reservoir comprises one of the following: a filling product tank, an auxiliary filling product tank, a buffer tank, a buffer tank of a sterilization or pasteurization device, a carbonization tank, a filler bowl of a filler, a central bowl of a filler, and a ring bowl of a filler.

4. The device according to claim 1, further comprising a filling valve in communication with the filling product reservoir, the filling valve configured to control the filling of the container to be filled with the filling product.

5. The device according to claim 4, wherein the filling valve is in direct communication with the filling product reservoir.

6. The device according to claim 1, further comprising a cleaning device provided in the filling product reservoir and configured to apply a cleaning fluid to filling-product-contacted surfaces of the filling product reservoir.

7. The device according to claim 6, wherein the cleaning device comprises a spray nozzle configured to spray filling-product-contacted surfaces of the filling product reservoir with the cleaning fluid.

8. The device according to claim 1, wherein the first fill level probe comprises a float-free measuring system.

9. The device according to claim 8, wherein the float-free measuring system comprises one of the following: an inductive measuring system, a resistive measuring system, a capacitive measuring system, a measuring system based on a guided microwave, an optical measuring system, an opto-electronic measuring system, and an ultrasonic measuring system.

10. The device according to claim 8, wherein the second fill level probe comprises a measuring system comprising a float.

11. The device according to claim 10, wherein the measuring system further comprises a distance sensor coupled to the float.

12. The device according to claim 11, further comprising a cleaning device provided in the filling product reservoir, the cleaning device comprising a spray nozzle configured to spray filling-product-contacted surfaces of the filling product reservoir with a cleaning fluid.

13. A method to fill a container with a filling product, the method comprising
providing a filling product reservoir for accommodating the filling product to be filled;
determining a filling product level in the filling product reservoir using a first fill level probe during a filling mode; and
determining a cleaning fluid level in the filling product reservoir during a cleaning mode by a second fill level probe.

14. The device according to claim 1, wherein the container is a beverage container and the device is part of a beverage filling plant system.

* * * * *